United States Patent
Tamaru

(10) Patent No.: US 7,446,910 B2
(45) Date of Patent: Nov. 4, 2008

(54) OPTICAL SCANNING DEVICE

(75) Inventor: Yasuo Tamaru, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1018 days.

(21) Appl. No.: 10/914,148

(22) Filed: Aug. 10, 2004

(65) Prior Publication Data
US 2006/0098994 A1 May 11, 2006

(30) Foreign Application Priority Data
Aug. 13, 2003 (JP) .............................. 2003-293049

(51) Int. Cl.
*H04N 1/04* (2006.01)
(52) U.S. Cl. .................. 358/474; 358/1.9; 358/475; 358/509; 348/208.1; 348/500; 399/410; 399/107
(58) Field of Classification Search ................. 358/474, 358/488, 486, 1.9, 501; 348/208.1, 500, 348/547; 399/107, 17, 410
See application file for complete search history.

(56) References Cited

U.S. PATENT DOCUMENTS

| 4,992,827 | A | * | 2/1991 | Kobayashi et al. ............. 399/6 |
| 5,485,245 | A | * | 1/1996 | Kobayashi et al. ............. 399/1 |
| 5,917,882 | A | * | 6/1999 | Khutoryansky et al. ...... 378/116 |
| 6,611,293 | B2 | * | 8/2003 | Tarnoff et al. ................ 348/441 |
| 2002/0019940 | A1 | * | 2/2002 | Matteson et al. ............. 713/184 |
| 2005/0030400 | A1 | * | 2/2005 | Shigeta ....................... 348/294 |

FOREIGN PATENT DOCUMENTS

JP        A 7-113972        5/1995

* cited by examiner

*Primary Examiner*—Edward L. Coles
*Assistant Examiner*—Negussie Worku
(74) *Attorney, Agent, or Firm*—Oliff & Berridge, PLC

(57) ABSTRACT

A laser-control circuit board is mounted in a scanner to extend substantially parallel to a base plate, a bottom cover, and a top cover of the scanner. A synchronization detection element is attached to the under surface of the laser-control circuit board. A light beam is emitted from a light source, deflected by a polygon mirror, and is guided below the laser-control circuit board by various optical elements including a condenser lens, thereby being finally detected by the synchronization detection element. A through-hole is formed through the laser-control circuit board to check whether the synchronization detection element is in alignment with the condenser lens and other optical elements below the laser-control circuit board.

15 Claims, 10 Drawing Sheets

OPTICAL SCANNING DEVICE

BACKGROUND OF THE INVENTION

1. Field of the Invention

The present invention relates to an optical scanning device used in an image forming device such as a laser printer. The present invention also relates to the image forming device employed with the optical scanning device.

2. Description of Related Art

An image forming device, such as a laser printer, employs an optical scanning device. The optical scanning device has a reflecting body such as a polygonal mirror. The image forming device modulates a laser beam emitted from a laser element, such as a semiconductor laser element, based on image information. The reflecting body deflects and scans the laser beam and focuses the laser beam on the surface of the photosensitive body, thereby forming an electrostatic latent image on the photosensitive body. The electrostatic latent image is then developed into a visible image by developing agent.

The optical scanning device is generally provided with a synchronization detection element. The synchronization detection element performs synchronization detection by detecting the light scanned by the reflecting body in order to synchronize the repeatedly-executed scanning operation with the image information desired to be recorded.

In order to let the synchronization detection element attain sufficient optical-reception sensitivity and to attain an accurate synchronization detection, the light deflected by the reflecting body has to be formed into a sufficiently small-diameter beam before the light falls incident on the synchronization detection element. It is therefore preferable to make the length of the optical path from the deflection point on the polygonal mirror to the synchronization detection element substantially equal to the length of the optical path from the deflection point on the polygonal mirror to the photosensitive body.

There has been proposed a conventional optical scanning device, which has both the semiconductor laser element and the synchronization detection element on the same surface of its base plate.

SUMMARY OF THE INVENTION

It is desired to mount not only the semiconductor laser element and the synchronization detection element but also circuit elements and capacitor on the base plate. However, it is impossible to freely arrange the various components on the base plate due to the requirements to make the length of the optical path from the deflection point on the polygonal mirror to the synchronization detection element substantially equal to the length of the optical path from the deflection point on the polygonal mirror to the photosensitive body. This reduces the degree of freedom of the arrangement of the components on the base plate.

Japanese Unexamined Patent Application Publication No. 7-113972 has proposed an optical scanning device of another type, in which a laser control circuit board (substrate) is mounted on a base plate of the optical scanning device and the substrate is oriented to extend substantially perpendicularly to the base plate. The polygonal mirror is mounted on the base plate, while the semiconductor laser element and the synchronization detection element are mounted on the substrate. The semiconductor laser element is mounted on one surface of the substrate, while the synchronization detection element is mounted on the other surface of the substrate, in order to make the length of the optical path from the deflection point on the polygonal mirror to the synchronization detection element substantially equal to the length of the optical path from the deflection point on the polygonal mirror to the photosensitive body.

If the other remaining relevant components such as the circuit elements and capacitor were mounted on the substrate together with the semiconductor laser element and the synchronization detection element, however, the size of the substrate will increase and thus the size of the optical scanning device in a direction normal to the base plate will also increases.

In view of the above-described drawbacks, it is an objective of the present invention to provide an improved optical scanning device that is compact in size and that scans light with high accuracy.

Another objective of the present invention is to provide an image forming device that is provided with the improved optical scanning device.

In order to attain the above and other objects, the present invention provides an optical scanning device, including: a base plate; a light source; a reflecting body; a condenser lens; a substrate; a synchronization detection element; and a circuit element. The base plate has a first surface and a second surface opposite to the first surface. The light source is mounted on the first surface of the base plate. The light source emits a light beam. The reflecting body is mounted on the first surface of the base plate. The reflecting body deflects and scans the light beam emitted from the light source. The condenser lens is mounted on the first surface of the base plate. The substrate is mounted on the base plate. The condenser lens is located between the base plate and the substrate. The substrate extends substantially parallel with the base plate. The substrate has a first substrate surface and a second substrate surface opposite to the first substrate surface. The second substrate surface of the substrate confronts the first surface of the base plate. The synchronization detection element is mounted on the second substrate surface of the substrate. The synchronization detection element receives the light that has been deflected by the reflecting body and that has passed through the condenser lens to perform synchronization detection for image formation. The circuit element is mounted on the first substrate surface of the substrate. The circuit element controls the light source.

According to another aspect, the present invention provides an image forming device, including: a photosensitive body; and an optical scanning device. The optical scanning device scans a light beam on the photosensitive body to form an electrostatic latent image on the photosensitive body. The optical scanning device includes: a base plate; a light source; a reflecting body; a condenser lens; a substrate; a synchronization detection element; and a circuit element. The base plate has a first surface and a second surface opposite to the first surface. The light source is mounted on the first surface of the base plate. The light source emits a light beam based on image data supplied from outside. The reflecting body is mounted on the first surface of the base plate. The reflecting body deflects and scans the light beam emitted from the light source. The condenser lens is mounted on the first surface of the base plate. The substrate is mounted on the base plate. The condenser lens is located between the base plate and the substrate. The substrate extends substantially parallel with the base plate. The substrate has a first substrate surface and a second substrate surface opposite to the first substrate surface. The second substrate surface of the substrate confronts the first surface of the base plate. The synchronization detection element is mounted on the second substrate surface of the substrate. The synchronization detection element receives the light that has been deflected by the reflecting body and that has passed through the condenser lens to perform synchronization detection for image formation. The circuit element is mounted on the first substrate surface of the substrate. The circuit element controls the light source.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figure 1:
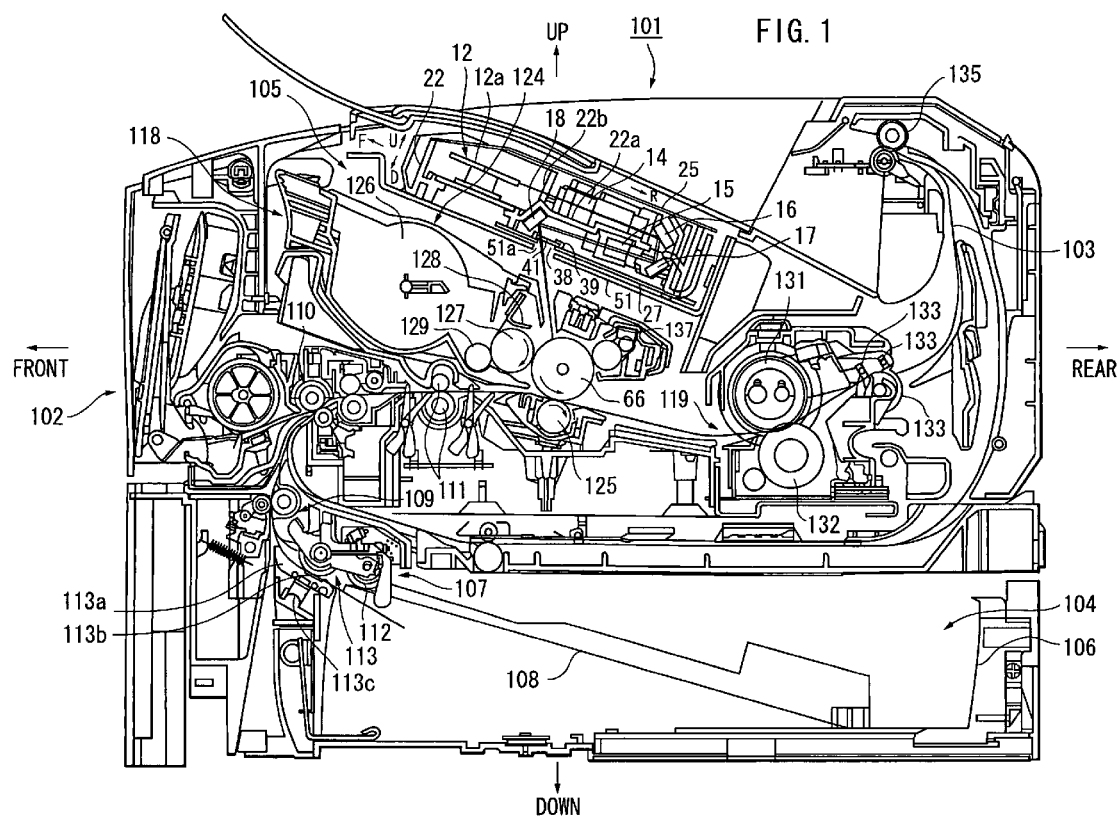
FIG. 1 is a cross-sectional side view of a laser printer, which employs a scanner according to a preferred embodiment of the present invention.

An optical scanning device and an image forming device according to a preferred embodiment of the present invention will be described while referring to the accompanying drawings wherein like parts and components are designated by the same reference numerals to avoid duplicating description.

A laser printer 101 according to the present embodiment has a configuration shown in FIG. 1. FIG. 1 is a cross-sectional side view of the laser printer 101.

In the following description, the expressions "front", "rear", "upper", "lower", "right", and "left" are used to define the various parts when the laser printer 101 is disposed in an orientation in which it is intended to be used. More specifically, the left side in FIG. 1 will be referred to as the front of the laser printer 101, while the right side will be referred to as the rear of the laser printer 101. Further, the top side in FIG. 1 will be referred to as the top of the laser printer 101, while the bottom side will be referred to as the bottom of the laser printer 101. In addition, the near side in FIG. 1 will be referred to as the right side of the laser printer 101, while the far side will be referred to as the left side of the laser printer 101.

The laser printer 101 is for forming images using an electrophotographic image forming technique. A feeder section 104 and an image forming section 105 are provided within a box-shaped main casing 102 of the laser printer 101. The feeder section 104 is for supplying sheets 103 (recording media). The image forming section 105 is for forming desired images on the supplied sheets 103.

The feeder section 104 is located within the lower section of the main casing 102, and includes: a sheet supply tray 106, a sheet feed mechanism 107, a sheet pressing plate 108, a first transport portion 109, a second transport portion 110, and registration rollers 111. The sheet supply tray 106 is detachably mounted to the main casing 102. The sheet feed mechanism 107 is provided at one end of the sheet supply tray 106. The sheet pressing plate 108 is mounted in the sheet supply tray 106. The first transport portion 109 and second transport portion 110 are provided at positions downstream from the sheet feed mechanism 107 with respect to a sheet transport direction, in which sheets 103 are transported. The registration rollers 111 are provided downstream from the first transport portion 109 and the second transport portion 110 in the sheet transport direction.

The sheet supply tray 106 has a box shape with the upper side open so that a stack of sheets 103 can be housed therein. The sheet supply tray 106 can be moved horizontally into and out from the lower section of the main casing 102 so as to be detachable from the main casing 102.

The sheet feed mechanism 107 is of a friction-separating type and is provided with a sheet supply roller 112 and a separation roller 113. A support frame 113a, a pad 113b, and a spring 113c are disposed in confrontation with the separation roller 113.

The sheet pressing plate 108 is capable of supporting a stack of sheets 103 thereon. The sheet pressing plate 108 is pivotably supported at its end furthest from the sheet supply roller 112 so that the end of the sheet pressing plate 108 that is nearest to the sheet supply roller 112 can move vertically. Although not shown in the drawing, a spring for urging the sheet pressing plate 108 upward is provided to the rear surface of the sheet pressing plate 108. Therefore, the sheet pressing plate 108 pivots downward in accordance with increase in the amount of stacked sheets 103 on the sheet pressing plate 108. At this time, the sheet pressing plate 108 pivots around the end of the sheet pressing plate 108 farthest from the sheet feed mechanism 107, downward against the urging force of the spring.

Urging force of the spring under the sheet pressing plate 108 presses the uppermost sheet 103 on the sheet pressing plate 108 toward the supply roller 112. Rotation of the supply roller 112 pinches the uppermost sheet 103 between the separation roller 113 and the pad 113b. Then, cooperative operation between the separation roller 113 and the pad 113b separates one sheet 103 at a time from the stack and supplies the sheet 103 to the image forming section 105.

The image forming section 105 includes: a scanner unit 60, a process cartridge 118, and a fixing section 119.

The scanner unit 60 is provided at the upper section of the main casing 102 and irradiates, in a high speed scanning operation, the surface of a photosensitive drum 66 in the process cartridge 118 based on image data supplied from outside.

The process cartridge 118 is disposed below the scanner unit 60 as shown in FIG. 1. The process cartridge 118 is attachable to and detachable from the main casing 102. The process cartridge 118 has the photosensitive drum 66, a developing cartridge 124, a scorotron charge unit 137, and a transfer roller 125.

The developing cartridge 124 is attachable to and detachable from the process cartridge 118. The developing cartridge 124 is provided with a toner hopper 126. The developing cartridge 124 further includes: a supply roller 129, a developing roller 127, and a layer thickness regulating blade 128.

The toner hopper 126 is filled with toner as a developing agent.

Toner is supplied to the developing roller 127 by rotation of the supply roller 129. The toner slides against the layer thickness regulating blade 128, and is borne on the developing roller 127 in a thin layer of a fixed thickness.

The photosensitive drum 66 is in confrontation with the developing roller 127. The photosensitive drum 66 is rotatably supported in the process cartridge 118. The photosensitive drum 66 includes a main body connected to ground and a surface portion formed from a photosensitive layer that is made from polycarbonate and that has a positively charging nature.

The scorotron charge unit 137 forms a positive charge uniformly on the surface of the photosensitive drum 66 as the photosensitive drum 66 rotates in the direction indicated by an arrow in FIG. 1. Then, the surface of the photosensitive drum 66 is exposed by high speed scan of the laser beam from the scanner unit 60. As a result, an electrostatic latent image is formed on the photosensitive drum 66 based on the image data.

Next, a reverse developing process is performed. That is, when the electrostatic latent image formed on the photosensitive drum 66 is brought into contacting confrontation with the developing roller 127, the positively-charged toner borne on the surface of the developing roller 127 is supplied to the electrostatic latent image on the photosensitive drum 66. That is, the toner is supplied to the exposed area of positively charged surface of the photosensitive drum 66. The electric potential of the exposed area has been decreased by the laser beam exposure. As a result, the toner is selectively borne on the photosensitive drum 66 so that the electrostatic latent image is developed into a visible toner image.

The transfer roller 125 is disposed below the photosensitive drum 66 in confrontation with the photosensitive drum 66. The transfer roller 125 is made from a metal roller shaft covered by a roller made of conductive rubber material. At times of toner image transfer, a transfer bias is applied to the transfer roller 125 relative to the photosensitive drum 66. The visible toner image borne on the surface of the photosensitive drum 66 is transferred onto the sheet 103 as the sheet 103 passes between the photosensitive drum 66 and the transfer roller 125. The sheet 103 on which the visible toner image has been transferred is transported to the fixing section 119.

The fixing section 119 is disposed in the rear side of the process cartridge 118. The fixing section 119 includes a thermal roller 131, a pressing roller 132, and three curl-removing rollers 133, which are provided in the rear side of the thermal roller 131 and the pressing roller 132. The thermal roller 131 is made from metal and is provided with a halogen lamp (heater). The toner which has been transferred onto the sheet of paper 103 in the process cartridge 118 is thermally fixed onto the sheet of paper 103 when the sheet of paper 103 passes between the thermal roller 131 and the pressing roller 132. Thereafter, the sheet of paper 103 is transferred by the curl-removing rollers 133 toward a discharge roller 135, which is provided to the main casing 102. The sheet of paper 103 is fed onto a discharge tray by the discharge roller 135.

It is noted that a tray 51 made of a steel plate is mounted in the laser printer 101. An opening 51*a* is formed through the tray 51. The opening 51*a* is of a long narrow slit shape and extends in the left-and-right direction of the laser printer 101. The tray 51 is oriented so that the opening 51*a* confronts the photosensitive drum 66.

Next, the scanner 60 of the present embodiment will be described in more detail with reference to FIG. 1 to FIG. 10.

It is noted that in FIG. 1-FIG. 10, the upward direction, the downward direction, the rightward direction, the leftward direction, the frontward direction, and the rearward direction of the scanner 60 are defined as being indicated by the arrows U, D, RH, LH, F, and R, respectively.

The scanner 60 is mounted on the tray 51 as shown in FIG. 1 so that the left side of the scanner 60 is located on the left side of the printer 101, the right side of the scanner 60 is located on the right side of the printer 101, the front side of the scanner 60 is located on the front side of the printer 101, the rear side of the scanner 60 is located on the rear side of the printer 101, the upper side of the scanner 60 confronts the upper side of the printer 101, the underside of the scanner 60 confronts the underside of the printer 101. In other words, the left-and-right direction (longitudinal direction) of the scanner 60 matches with the left-and-right direction of the printer 101. Because the tray 51 is slightly slanted downwardly toward the rear side of the laser printer 101, the front-and-rear direction (widthwise direction) and the upward-and-downward direction (thickness direction) of the scanner 60 are slightly slanted relative to the front-and-rear direction and the upward-and-downward direction of the printer 101. However, the front-and-rear direction and the upward-and-downward direction of the scanner 60 substantially correspond to the front-and-rear direction and the upward-and-downward direction of the printer 101, respectively.

Figure 2:
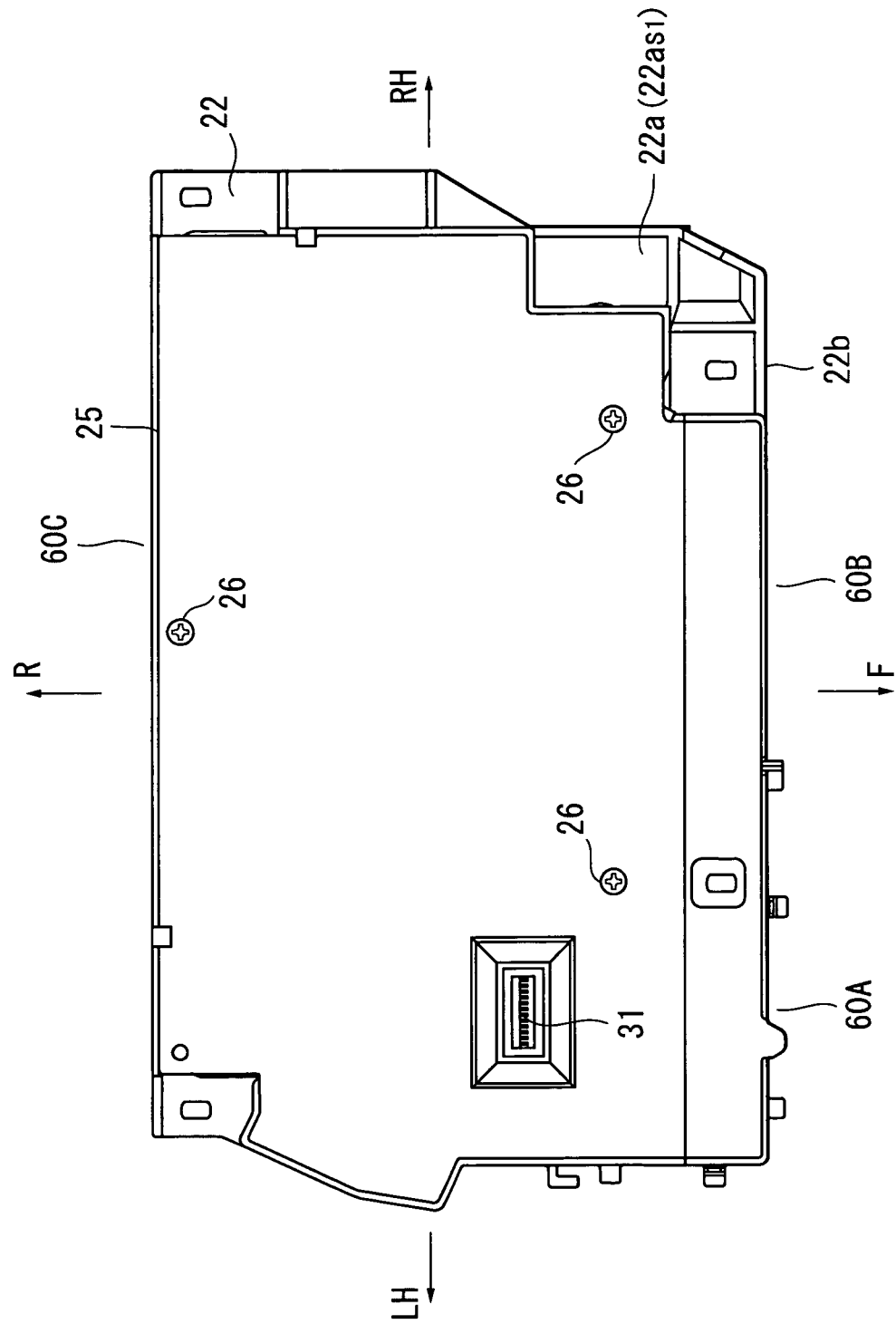
FIG. 2 is a plan view of the scanner.
Figure 3:
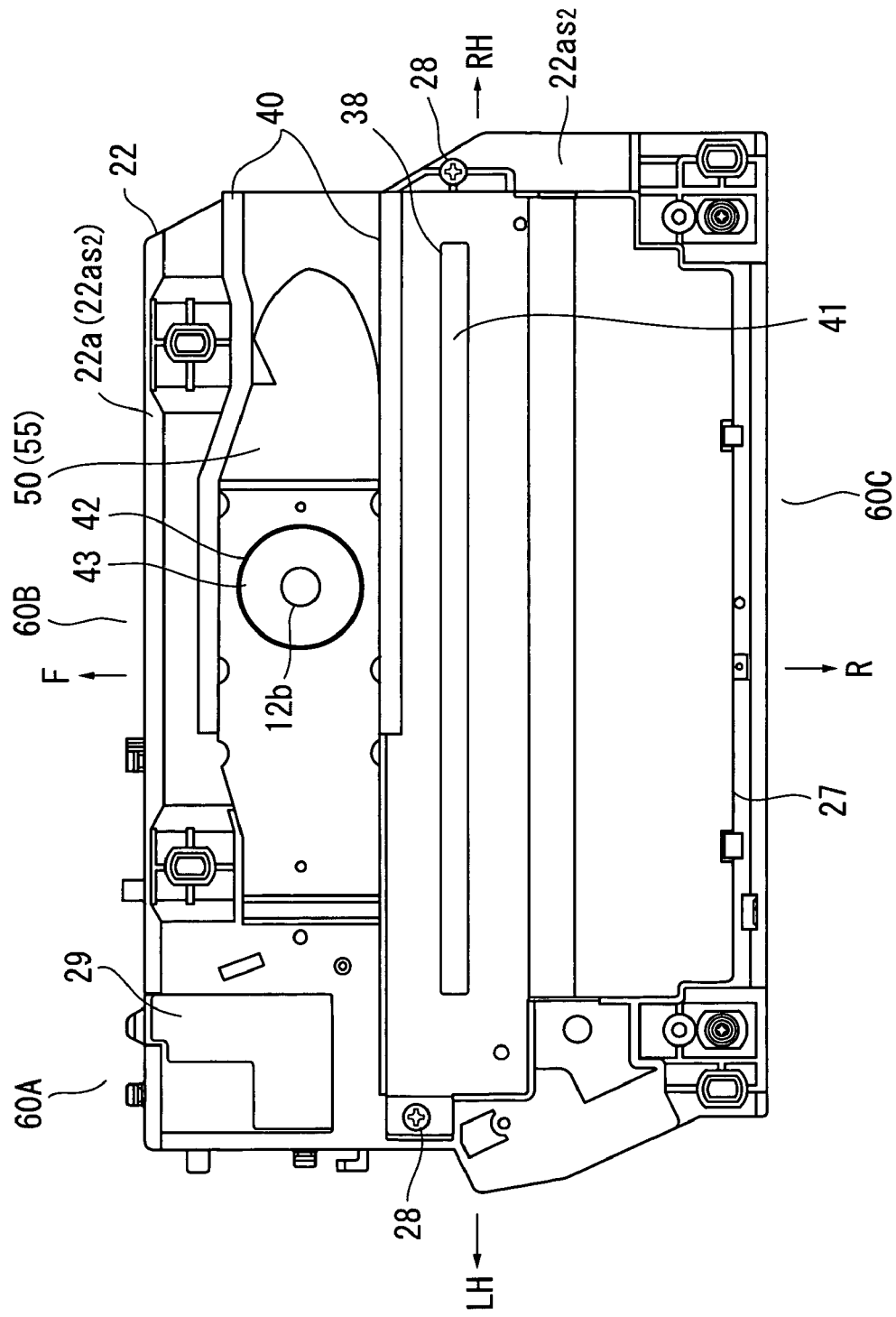
FIG. 3 is a bottom view of the scanner.

FIG. 2 and FIG. 3 are a plan view and a bottom view of the scanner 60, respectively.

As shown in FIG. 1, FIG. 2, and FIG. 3, the scanner 60 mainly includes: a scanner frame 22, a top cover 25, and a bottom cover 27. The scanner frame 22 is made of resin mixed with reinforcement such as glass fiber and the like. The top cover 25 is made of iron. The bottom cover 27 is also made of iron.

The scanner 60 includes therein: a synchronization detection part 60A; a polygon motor supporting-and-cooling part 60B; and a laser beam scanning part 60C. The synchronization detection part 60A and the polygon motor supporting-and-cooling part 60B are located in the front side of the scanner 60. The laser beam scanning part 60C is located in the rear side of the scanner 60. As shown in FIG. 2, the top cover 25 covers an almost entire part of the top of the scanner frame 22. As shown in FIG. 3, the bottom cover 27 covers a part of the bottom of the scanner frame 22 that corresponds to the laser beam scanning part 60C.

Figure 5:
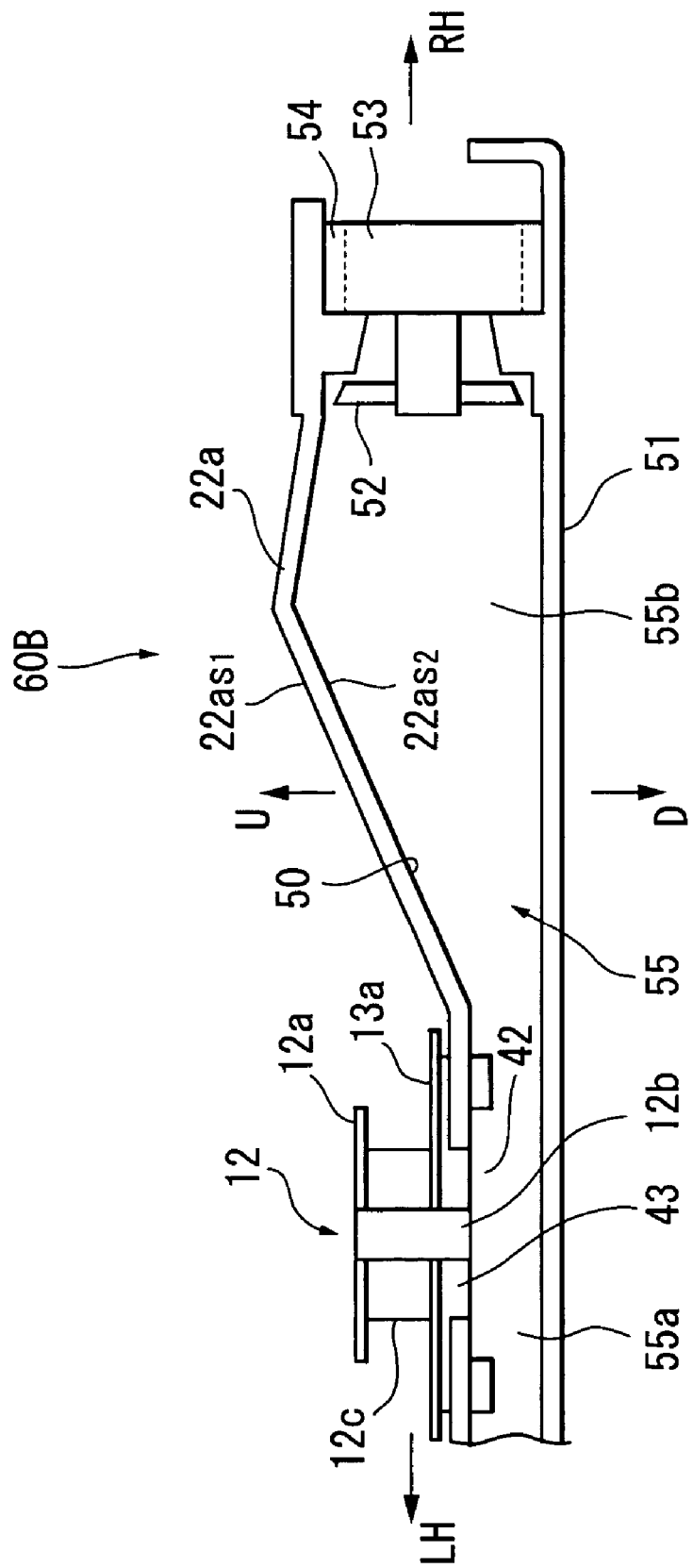
FIG. 5 is a cross-sectional side view of the scanner taken along a line V-V in FIG. 4(a)
Figure 6:
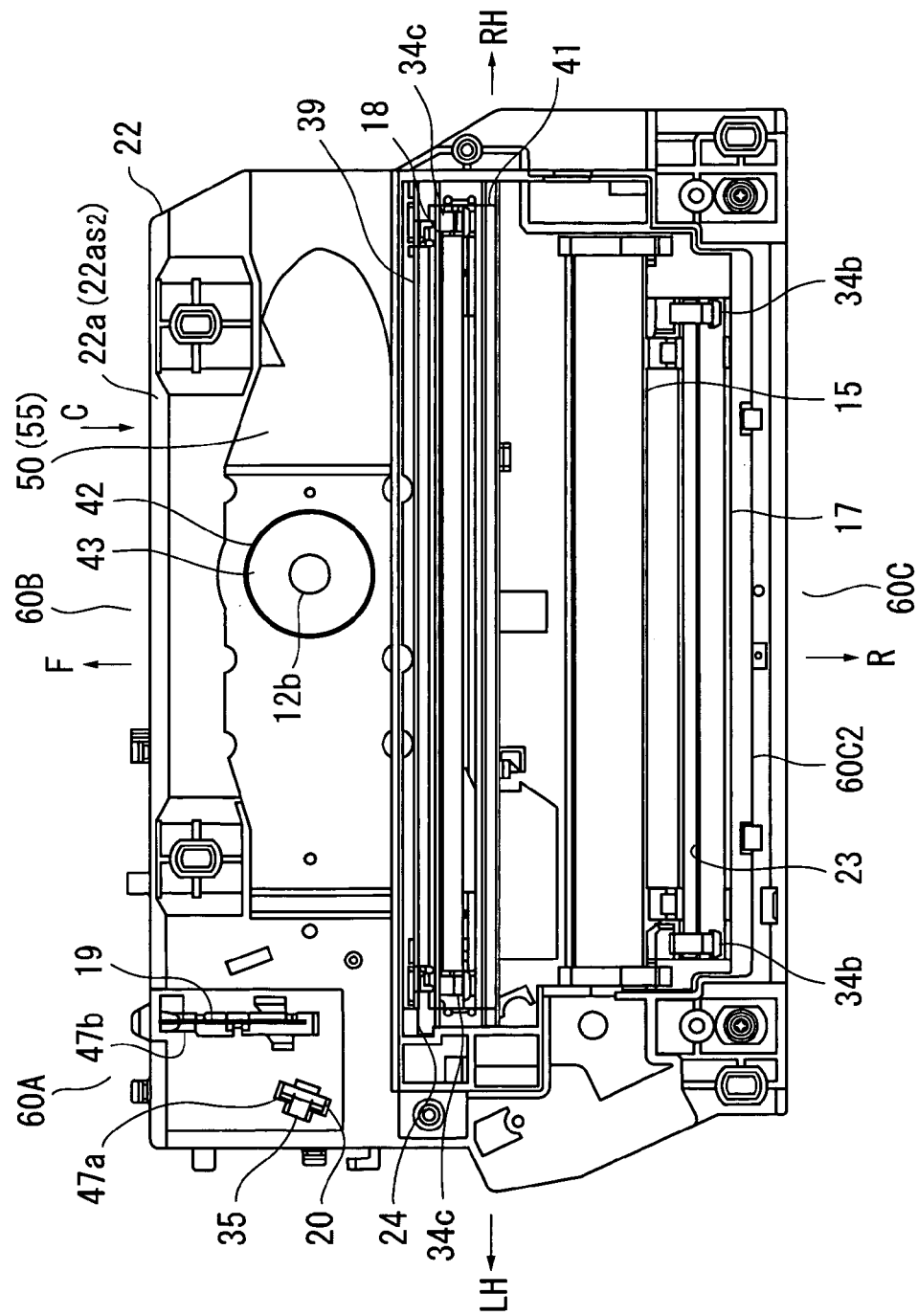
FIG. 6 is a bottom view of the scanner, from which a bottom cover is removed.
Figure 7:
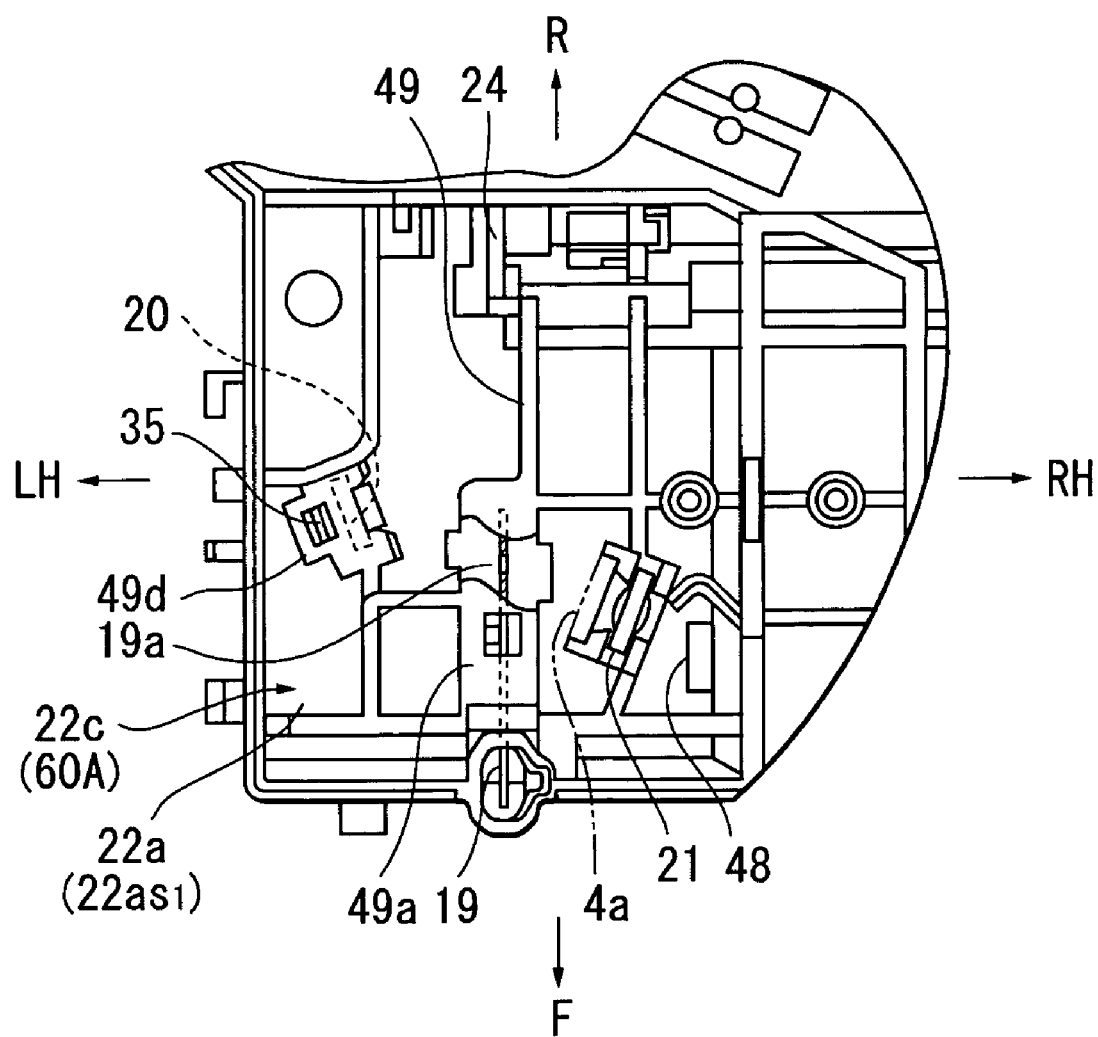
FIG. 7 is a plan illustration showing a positional relationship among components provided below a laser control circuit board.
Figure 8:
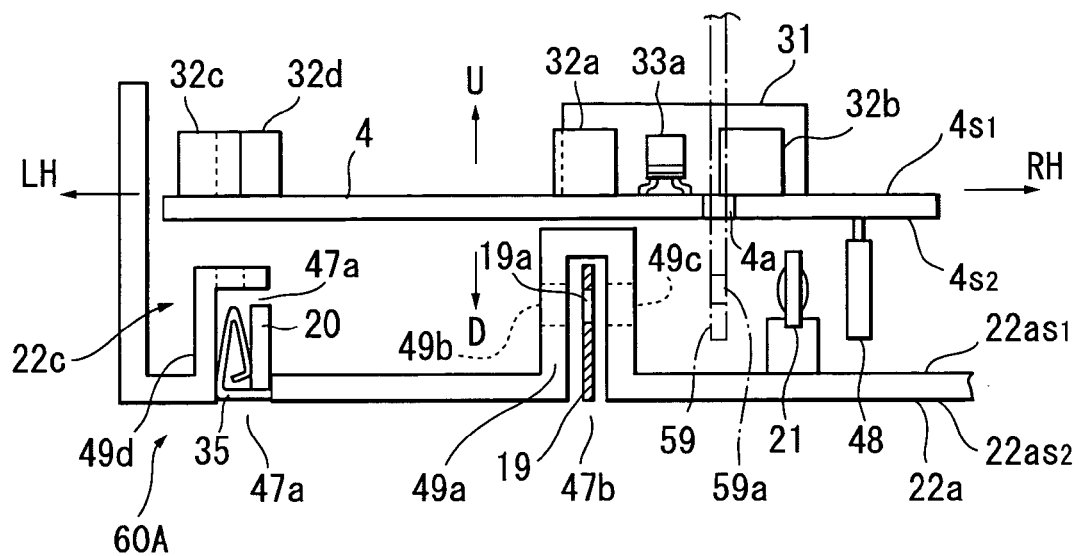
FIG. 8 is a side illustration showing a positional relationship among components provided above and below the laser control circuit board.

FIG. 4(*a*) is a plan view showing the scanner 60 mounted on the tray 51. In FIG. 4(*a*), the top cover 25 is removed from the scanner 60. FIG. 4(*b*) is a detailed illustration of a portion IVb in FIG. 4(*a*). FIG. 5 is a cross-sectional side view taken along a line V-V in FIG. 4(*a*). FIG. 6 is a bottom view of the scanner 60, from which the bottom cover 27 is removed. FIG. 7 is a plan illustration showing how components are arranged below a laser control circuit board 4 (to be described later) when the laser control circuit board 4 is mounted in the scanner 60. FIG. 8 is a side illustration showing how components are arranged above and below the laser control circuit board 4 when the laser control circuit board 4 is mounted in the scanner 60. It is noted that in FIG. 8, a film 29 to be described later is removed from the scanner 60. FIG. 9(*a*) is a perspective view of the scanner 60 viewed from the top. In FIG. 9(*a*), the top cover 25 is removed from the scanner 60. FIG. 9(*b*) is a perspective view of the scanner 60 viewed from the bottom. In FIG. 9(*b*), the bottom cover 27 and a cover glass 41, a glass holder 39, and the film 29 (which will be described later) are removed from the scanner 60.

Figure 4A:
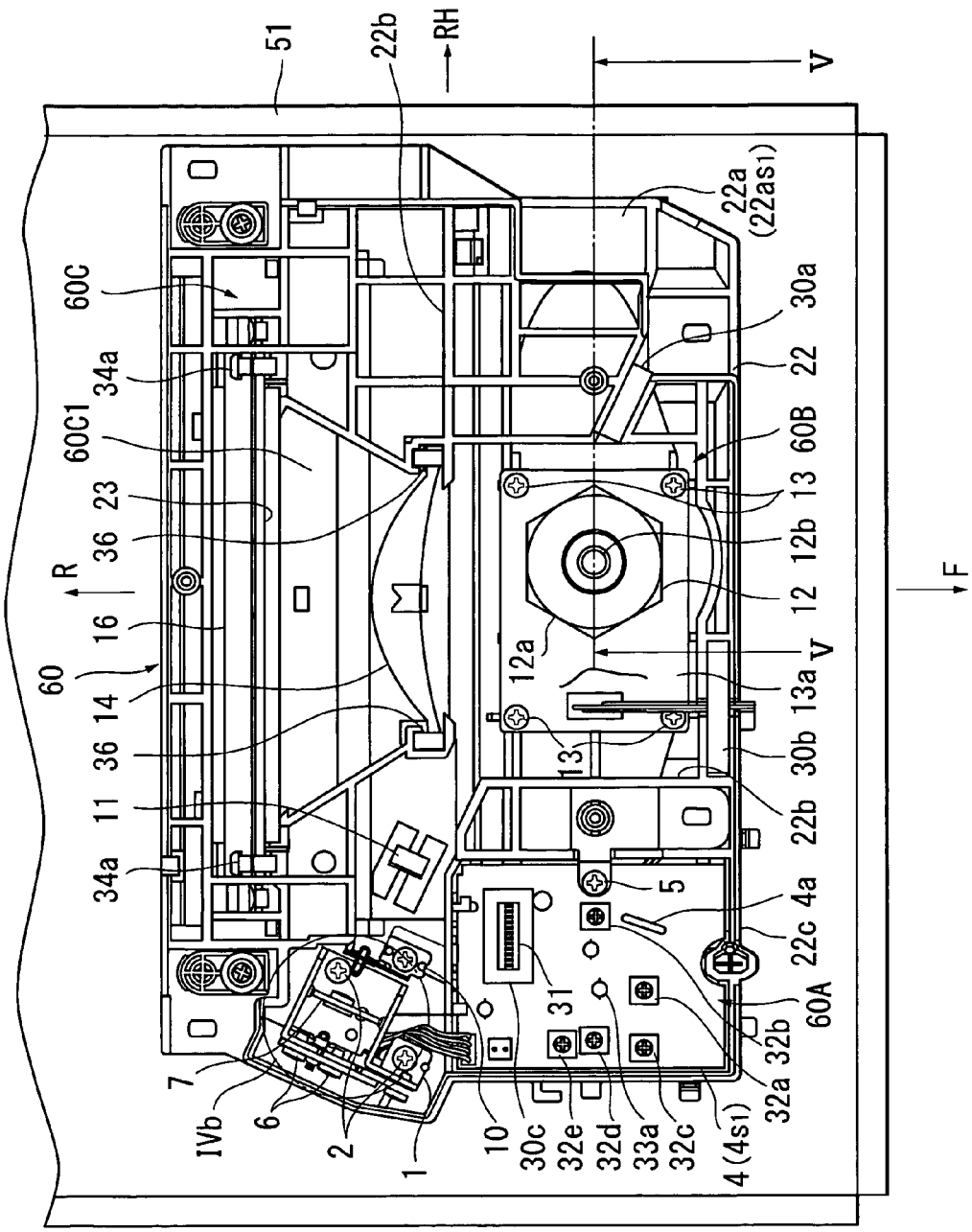
FIG. 4(a) is a plan view of the scanner, from which a top cover is removed and which is mounted on a tray in the laser printer of FIG. 1.
Figure 9A:
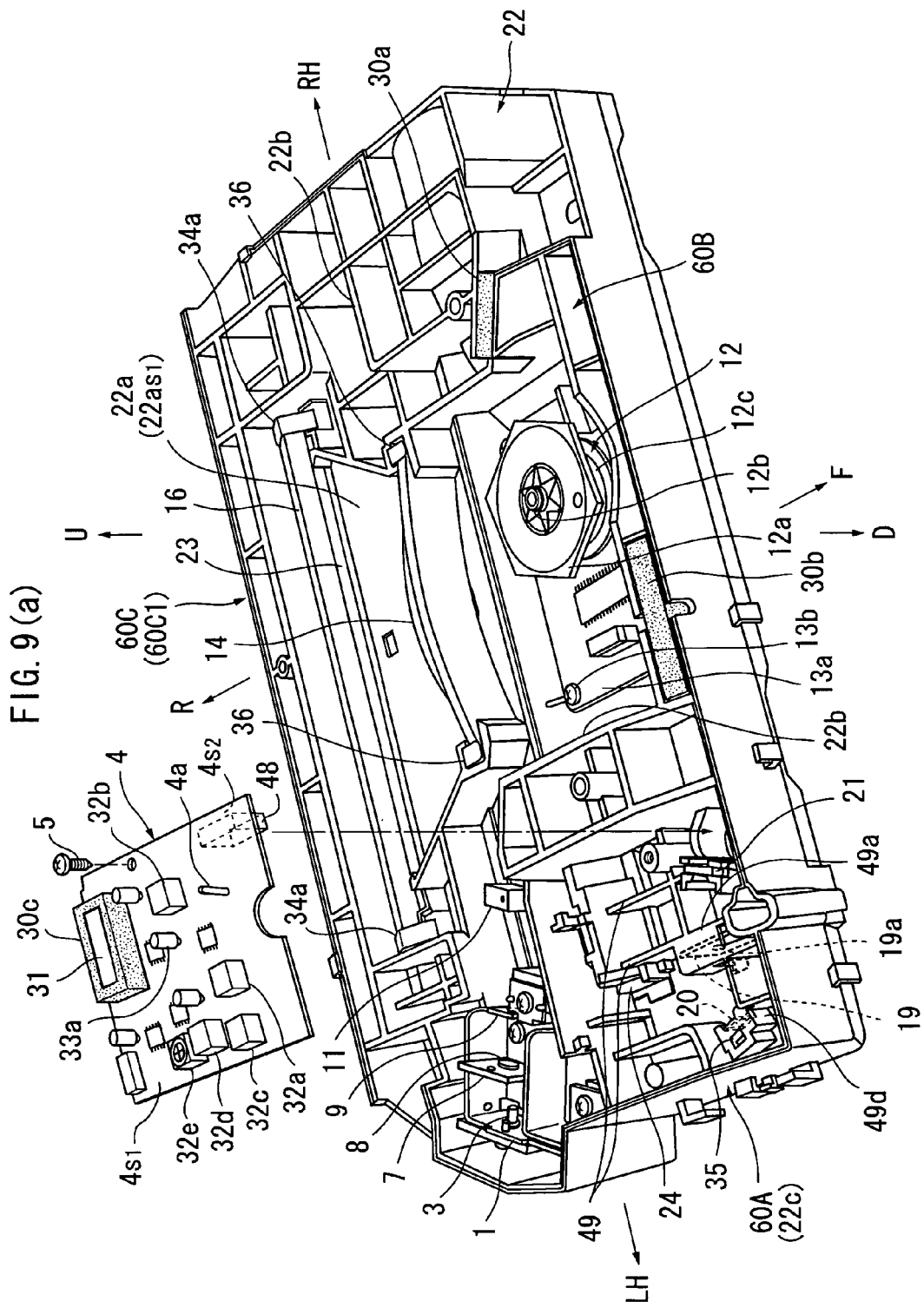
FIG. 9(a) is a perspective view of the scanner viewed from the top, with the top cover being removed from the scanner.
Figure 9:
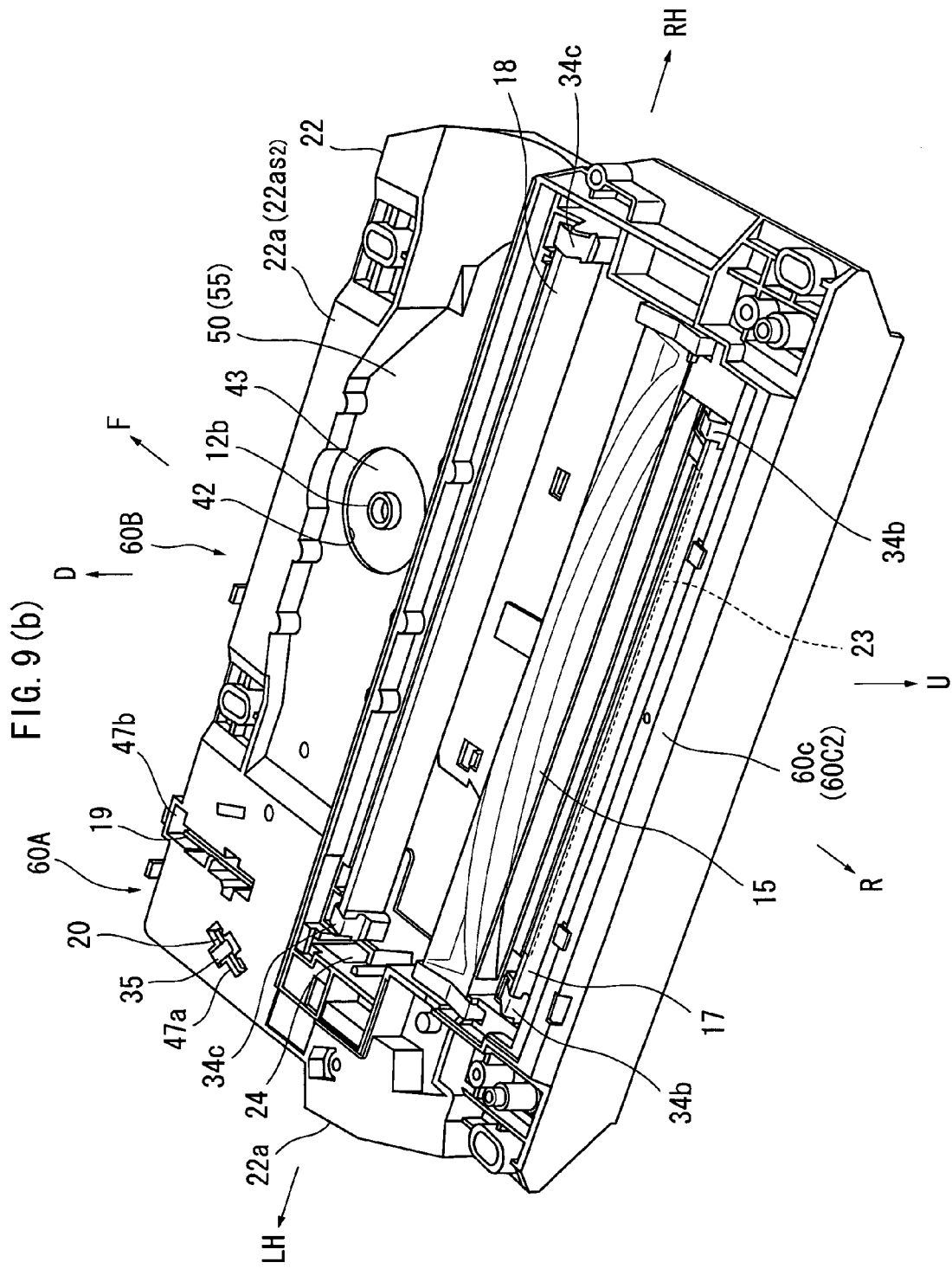
FIG. 9(b) is a perspective view of the scanner viewed from the bottom, with the bottom cover, a cover glass, a glass holder, and the film being removed from the scanner.

As shown in FIG. 4(a), FIG. 6, FIG. 9(a), and FIG. 9(b), the scanner frame 22 includes a base plate 22a. The base plate 22a has an upper surface 22as1 and an under surface 22as2 opposite to the upper surface 22as1. The upper surface 22as1 of the base plate 22a faces in the upward direction U, while the under surface 22as2 of the base plate 22a faces in the downward direction D. As shown in FIG. 4(a) and FIG. 9(a), a plurality of ribs 22b protrude from the upper surface 22as1 of the base plate 22a in the upward direction U.

First, the polygon motor supporting-and-cooling part 60B will be described below.

As shown in FIG. 4(a) and FIG. 9(a), a polygon motor 12 is mounted on the upper surface 22as1 of the base plate 22a in the polygon motor supporting-and-cooling part 60B. As shown in FIG. 6 and FIG. 9(b), a groove 50 is formed on the under surface 22as2 of the base plate 22a in the polygon motor supporting-and-cooling part 60B.

Next, the laser beam scanning part 60C will be described.

As shown in FIG. 4(a) and FIG. 9(a), an upper side laser-beam scanning area 60C1 is defined on the upper surface 22as1 of the base plate 22a in the laser beam scanning part 60C. As shown in FIG. 6 and FIG. 9(b), an underside laser-beam scanning area 60C2 is defined on the under surface 22as2 of the base plate 22a in the laser beam scanning part 60C.

Next, the synchronization detection part 60A will be described below.

As shown in FIG. 4(a), FIG. 7, FIG. 8, and FIG. 9(a), a synchronization detection room 22c is defined on the upper surface 22as1 of the base plate 22a in the synchronization detection part 60A. A laser-control circuit board 4 is mounted over the synchronization detection room 22c. As shown in FIG. 3, the film 29 is attached to the under surface 22as2 of the base plate 22a in the synchronization detection part 60A.

The polygon motor supporting-and-cooling part 60B will be described below in more detail.

As shown in FIG. 5, FIG. 6, FIG. 9(a), and FIG. 9(b), the polygon motor 12 is mounted via a motor spacer 43 and a motor-control circuit board 13a to the base plate 22a. More specifically, a circular through-hole 42 is formed through the base plate 22a. The motor spacer 43 has a larger-diameter disc portion and a smaller-diameter disc portion, which are integrally formed with each other and which are coaxial with each other. The smaller-diameter disc portion of the motor spacer 43 is fitted to the circular through-hole 42. The smaller-diameter disc portion of the motor spacer 43 is therefore exposed to the groove 50 on the under surface 22as2 of the base plate 22a. The motor spacer 43 is made of aluminum. The motor-control circuit board 13a is mounted on the motor spacer 43. The motor-control circuit board 13a is for controlling drive of the polygon motor 12, and is fixedly secured to the upper surface 22as1 of the base plate 22a via screws 13b.

As shown in FIG. 4(a), FIG. 5, and FIG. 9(a), the polygon motor 12 includes: a polygon mirror (hexagonal mirror, in this example) 12a; a motor shaft 12b; and a motor portion 12c. The polygon mirror 12a and the motor portion 12c are integrally formed with each other, and are mounted rotatably on the motor shaft 12b. The polygon motor 12 is mounted on the motor-control circuit board 13a, with the motor shaft 12b passing through the motor-control circuit board 13a and through the motor spacer 43. The polygon motor 12 rotates around the motor shaft 12b, thereby rotating the polygon mirror 12a around the motor shaft 12b and allowing the polygon mirror 12a to deflect and scan a laser beam along the upper surface 22as1 of the base plate 22a.

As shown in FIG. 5, FIG. 6, and FIG. 9(b), the circular through-hole 42 is located within the groove 50. The groove 50 extends from the location where the circular through-hole 42 is formed toward the righside edge of the scanner frame 22. As shown in FIG. 5, the duct 55 is defined between the under surface 22as2 of the base plate 22a in the groove 50 and the upper surface of the tray 51. A fan 52 is mounted at the rightside edge of the duct 55. The fan 52 is an electric fan, and is supported by a fan holder 53. The fan holder 53 is held between the under surface 22as2 of the base plate 22a and the tray 51 via sponges 54 made of urethane foam. The fan 52 cools down the polygon motor 12 by guiding the air heated by the polygon motor 12 in the vicinity of the polygon motor 12 through the duct 55 and out of the scanner frame 22. By cooling the polygon motor 12, it is possible to prevent warping or deformation of the scanner frame 22, on which the polygon motor 12 is mounted, due to heat. It is possible to prevent occurrence of deviations in an optical path of a light beam.

The cross-sectional area of the duct 55 in the vicinity of the polygon motor 12 is smaller than the cross-sectional area of the duct 55 in the vicinity of the fan 52. The flowing speed of air passing through the duct 55 in the vicinity of the polygon motor 12 (first duct portion 55a) is therefore greater than the flowing speed of air passing through the duct 55 in the vicinity of the fan 52 (second duct portion 55b). This can increase the cooling efficiency for the polygon motor 12.

In addition, the motor spacer 43 is made of aluminum. Accordingly, the motor spacer 43 is cooled rapidly due to the high thermal conductivity of aluminum. This enables an even greater increase in the cooling efficiency of the polygon motor 12.

As described above, the duct 55 is configured by the scanner frame 22 and the tray 51 that supports the scanner frame 22 thereon. This configuration does not require the provision of special components for the duct 55, and reduces the number of components.

The fan holder 53 is held between the scanner frame 22 and the tray 51 via the sponges 54 made of urethane foam. Any vibrations generated by the rotation of the fan 52 are not transmitted to the scanner frame 22 or the tray 51. It is possible to prevent changes from occurring in the optical path of light that is scanned by the polygon motor 12. Any vibrations generated by the rotation of the fan 52 do not affect alignment between a condenser lens 21 and a synchronization detection element 48 (FIG. 8) to be described later.

The fan 52 is attached to a portion of the underside 22as2 of the base plate 22a that is located outside of the scanner frame 22 and therefore that confronts the tray 51. The fan 53 can be easily attached to the scanner frame 22 by simply attaching the fan 53 to the under surface 22as2 (outer side surface) of the base plate 22a.

Next, the laser beam scanning part 60C will be described in more detail.

Figure 4B:
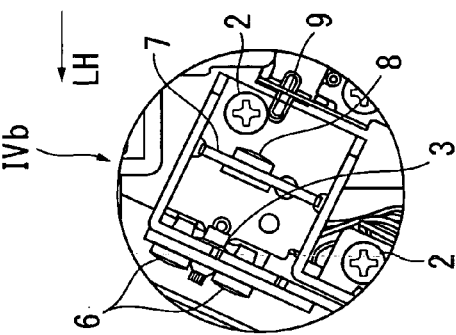
FIG. 4(b) is a detailed plan view of a portion IVb in FIG. 4(a)

In the laser beam scanning part 60C, as shown in FIG. 4(a), FIG. 4(b), and FIG. 9(a), a light source 3, a collimator lens 8, a collimator slit plate 9, a cylindrical lens 11, a fθ lens 14, and a mirror 16 are provided on the upper surface 22as1 of the base plate 22a (upper side laser-beam scanning area 60C1).

The collimator lens 8, the collimator slit plate 9, and the cylindrical lens 11 are disposed between the light source 3 and the polygon motor 12 in this order from the light source 3.

The light source 3 is for emitting a laser beam modulated based on image data supplied from outside. The light source 3 is a semiconductor laser device having two semiconductor laser elements (light-emitting elements/not shown in the figures). For example, the semiconductor laser device 3 is constructed from a semiconductor laser array, in which two semiconductor laser elements are arranged. The light source 3 is supported on a laser diode holder 1 by screws 6. The laser diode holder 1 is fixedly secured to the upper surface 22as1 of the base plate 22a by screws 2.

The collimator lens 8 is supported on the upper surface 22as1 of the base plate 22a via a collimator lens holder 7. The collimator lens 8 is for collimating the laser beam into a parallel light ray.

The collimator slit plate 9 is mounted on the upper surface 22as1 of the base plate 22a. The collimator slit plate 9 is formed with a slit (not shown). When the laser beam passes through the slit, the shape of the laser beam is converted into a beam shape corresponding to the shape of the slit.

The cylindrical lens 11 is mounted on the upper surface 22as1 of the base plate 22a. The cylindrical lens 11 is for refracting the laser beam in a direction perpendicular to the base plate 22a and for focusing the laser beam on the polygon mirror 12a.

The fθ lens 14 is attached by a pair of holding leaf springs 36 to the upper surface 22as1 of the base plate 22a.

The mirror 16 is attached by another pair of holding leaf springs 34a to the upper surface 22as1 of the base plate 22a. The mirror 16 extends in the right-and-left direction. The mirror 16 is oriented by an angle of 45 degrees with respect to the upper surface 22as1 of the base plate 22a.

An opening 23 is formed through the base plate 22a. The opening 23 is of a narrow long slit shape that extends along the mirror 16.

When the laser beam falls incident on the polygon mirror 12a and is scanned by the polygon mirror 12a at a constant angular velocity, the fθ lens 14 converts this laser beam into a constant speed scanning. The mirror 16 reflects and relays the laser beam that has passed through the fθ lens 14 toward the underside of the scanner frame 22.

As shown in FIG. 6 and FIG. 9(b), on the under surface 22as2 of the base plate 22a in the laser beam scanning part 60C (underside laser-beam scanning area 60C2), there are provided: another mirror 17, another cylindrical lens 15, and another mirror 18.

The mirror 17 is attached by another pair of holding leaf springs 34b to the under surface 22as2 of the base plate 22a. The mirror 17 extends along the opening 23 in the right-and-left direction. The mirror 17 is oriented by an angle of 45 degrees with respect to the under surface 22as2 of the base plate 22a. The mirror 17 is for receiving the laser beam that has passed through the opening 23 and for guiding the laser beam along the under surface 22as2 of the base plate 22a.

The cylindrical lens 15 is for refracting the laser beam in a direction perpendicular to the base plate 22a to correct surface misalignment of the polygon motor 12.

The mirror 18 is attached by another pair of holding leaf springs 34c to the under surface 22as2 of the base plate 22a. The mirror 18 extends in the right-and-left direction. The mirror 18 is oriented by an angle of 45 degrees with respect to the under surface 22as2 of the base plate 22a. The mirror 18 is for reflecting the laser beam that has passed through the cylindrical lens 15 and for letting the laser beam out of the scanner 60 toward the photosensitive drum 66.

As shown in FIG. 9(b), an opening 24 is formed through the base plate 22a at a location that is left to a leftside end of the mirror 18 and that is within a predetermined scanning range of the laser beam. In other words, the opening 24 and the mirror 18 are disposed within the total scan range of the light from the cylindrical lens 15. As shown in FIG. 9(a), the opening 24 communicates the underside of the base plate 22a in the laser beam scanning part 60C (underside laser-beam scanning area 60C2/FIG. 9(b)) to the upper side of the base plate 22a in the synchronization detection part 60A (synchronization detection room 22c/FIG. 9(a)).

As shown in FIG. 1 and FIG. 6, the glass holder 39 is mounted on the underside of the base plate 22a at a location confronting the mirror 18. The glass holder 39 extends in the right-and-left direction and is supported at their opposite ends by the right and left side edges of the base plate 22a. The cover glass 41 is supported on the glass holder 39. The cover glass 41 is a narrow glass plate that extends in the right-and-left direction and that confronts the mirror 18.

Next, the synchronization detection part 60A will be described in more detail.

As shown in FIG. 4, FIG. 7, FIG. 8, and FIG. 9(a), the synchronization detection room 22c is defined on the upper surface 22as1 of the base plate 22a in the synchronization detection part 60A. The synchronization detection room 22c is communicated via the opening 24 with the underside of the base plate 22a in the laser beam scanning part 60C.

In the synchronization detection room 22c, a plurality of synchronization-detection-room ribs 49 are provided to protrude in the upward direction U from the upper surface 22as1 of the base plate 22a. That is, each rib 49 extends in a direction intersecting with the base plate 22a.

A condenser lens 21 is mounted on the upper surface 22as1 of the base plate 22a.

As shown in FIG. 6, FIG. 7, FIG. 8, FIG. 9(a), and FIG. 9(b), a mirror mount 49d is provided on the upper surface 22as1 of the base plate 22a. A hollow space (mirror-mount room) 47a is formed in the mirror mount 49d. The hollow space 47a is opened on the under surface 22as2 of the base plate 22a. The hollow space 47a is opened also on one side of the mirror mount 49d that confronts the opening 24. A beam detect mirror 20 and a holding leaf spring 35 are inserted into the hollow space 47a from the under surface 22as2 of the base plate 22a. The beam detect mirror 20 is held by the holding leaf spring 35 so as to be oriented to confront the opening 24. With this construction, as will be described later, a laser beam that has entered the synchronization detection room 22c through the opening 24 reflects off the beam detect mirror 20.

As shown in FIG. 6, FIG. 7, FIG. 8, FIG. 9(a), and FIG. 9(b), the synchronization-detection-room ribs 49 include a slit-plate supporting rib 49a. As shown in FIG. 6 and FIG. 8, a recess 47b is formed in the slit-plate supporting rib 49a and is opened on the under surface 22as2 of the base plate 22a. A pair of opposite through-holes 49b and 49c are formed through the slit-plate supporting rib 49a. A slit plate 19 is inserted in the slit-plate supporting recess 47b from the under surface 22as2 of the base plate 22a. A slit 19a is formed through the slit plate 19. The slit 19a confronts the beam detect mirror 20 via the through-hole 49b, and confronts the condenser lens 21 via the through-hole 49c.

As shown in FIG. 4(a), FIG. 7, FIG. 8, and FIG. 9(a), the laser-control circuit board (substrate) 4 is mounted on the upper edges of the synchronization-detection-room ribs 49. In this way, the synchronization detection room 22c is defined as a space between the base plate 22a in the synchronization-detection part 60A and the laser-control circuit board (substrate) 4. The laser-control circuit board 4 is fixed by a screw 5 to the upper edge of one synchronization-detection-room rib 49.

The laser-control circuit board 4 is of a flat plate shape. Components such as a connector 31, circuit elements 32a to 32e, and a capacitor 33a are mounted on the upper surface 4s1 of the laser-control circuit board 4. The synchronization detection element 48 is mounted on the under surface 4s2 of the laser-control circuit board 4. An electrical circuit, which is connected by solder, is also provided on the under surface 4s2 of the laser-control circuit board 4. A through-hole 4a is formed through the laser-control circuit board 4. When the laser-control circuit board 4 is mounted on the upper edges of the synchronization-detection-room ribs 49, the synchronization detection element 48 is located confronting the condenser lens 21, and the through-hole 4a is located at a position between the slit-plate supporting rib 49a and the condenser lens 21.

The circuit elements 32a to 32e are for controlling the outputs of the two semiconductor laser elements (not shown in the figures) in the light source 3. Representative examples of the circuit elements 32a to 32e include: a light-emission controller for adjusting the outputs of the semiconductor laser elements in the light source 3; a modulation controller for modulating the outputs of the semiconductor laser elements; and an output adjustment controller for executing either rough adjustment or fine adjustment of the outputs of the semiconductor laser elements. By controlling the semiconductor laser elements by the circuit elements 32a-32e, it is possible to increase the resolution of the laser printer 101.

The synchronization detection element 48 is a light intensity detection device, which issues a sensing signal upon receipt of light whose intensity is greater than a predetermined threshold. A control portion (not shown) in the laser printer 101 receives the sensing signal, and executes a control operation to synchronize the repeatedly-executed scanning operation with the image data by outputting control signals to the laser-control circuit board 4 and the motor-control circuit board 13a.

Since the synchronization detection element 48 is attached to the under surface 4s2 of the laser-control circuit board 4, the connector 31, the circuit elements 32a to 32e, and the capacitor 33a can be arranged on the upper surface 4s1 of the laser-control circuit board 4 with a high freedom.

Because the connector 31, circuit elements 32a to 32e, and capacitor 33a are mounted on the upper surface 4s1 of the base plate 4 and are not mounted on the under surface 4s2 of the base plate 4, the shape, size, and arrangement of the synchronization-detection room ribs 49 can be freely selected. The synchronization-detection room ribs 49 add the strength and rigidity to the scanner frame 22, thereby preventing warping or deformation of the scanner frame 22 due to heat and preventing the occurrence of deviations in the optical path of the light beam.

By thus arranging the condenser lens 21 and the synchronization detection element 48 in the synchronization-detection room 22c, it is possible to decrease the size of the scanner 60 both in a direction parallel to the base plate 22a and in another direction perpendicular to the base plate 22a.

As shown in FIG. 1 and FIG. 2, the top cover 25 is mounted on the upper edges of the ribs 22b to cover the top of the base plate 22a, thereby protecting the components disposed on the upper side of the base plate 22a.

The top cover 25 is attached to the upper edges of the ribs 22b via upper cover attachment screws 26, with sponges 30a, 30b, and 30c (FIG. 4(a) and FIG. 9(a)) being provided between the base plate 22a and the upper cover 25.

As shown in FIG. 3, the film 29 is attached to the under surface 22as2 of the base plate 22a in the synchronization detection part 60A, covering the through-hole 47a and the recess 47b (FIG. 6).

As shown in FIG. 1 and FIG. 3, the bottom cover 27 is provided covering a part of the under surface 22as2 of the base plate 22a, thereby protecting the components mounted on the under surface 22as2 of the base plate 22a in the laser beam scanning part 60C. The bottom cover 27 is attached to the right and left side edges of the base plate 22a via bottom cover attachment screws 28. Sponges 40 are provided on a part of the front and rear side edges of the groove 50. The scanner 60 is mounted on the tray 51 via the sponges 40 therebetween.

An opening 38 is formed through the bottom cover 27. The opening 38 is of a narrow slit-shape and extends along the longitudinal direction (right-and-left direction) of the scanner 60. A part of the cover glass 41, which is mounted on the underside of the base plate 22a via the glass holder 39 (FIG. 6), is exposed through the opening 38, and serves as a window.

As shown in FIG. 1, when the scanner 60 having the above-described configuration is mounted on the tray 51, the part of the cover glass 41 is exposed through the opening 38 of the bottom cover 27 and through the opening 51a of the tray 51, thereby facing the photosensitive drum 66.

With the above-described configuration, when the scanner 60 is mounted in the laser printer 101 as shown in FIG. 1, the scanner 60 operates in a manner described below.

As shown in FIG. 9(a), a light beam emitted from the light source 3 passes through the collimator lens 8. The light beam is converted by the collimator lens 8 into a parallel light beam. The parallel light beam passes through the slit (not shown) in the collimator slit plate 9 and then passes through the cylindrical lens 11. The light beam is then deflected and scanned by the polygon mirror 12a, which rotates at a high speed, to form a deflected light. The deflected light passes through the fθ lens 14, reflects off the mirror 16 by a right-angle, and enters the underside of the scanner 60 through the opening 23.

As shown in FIG. 9(b), on the underside of the scanner 60, the light further reflects off the mirror 17 by a right angle and then passes through the cylindrical lens 15. After outputting from the cylindrical lens 15, the light is scanned in the RH direction along the under surface 22as2 of the base plate 22a as the polygon motor 12 rotates.

When the light reaches the mirror 18, the light reflects off the mirror 18, outputs the scanner 60 through the cover glass 41, and is finally irradiated on the photosensitive drum 66. Thus the light scans the photosensitive drum 66 as the polygon motor 12 rotates.

When the light reaches the opening 24, as shown in FIG. 7 and FIG. 9(a), the light enters the synchronization detection room 22c through the opening 24 and reflects off the beam detection mirror 20. The light then passes through the slit 19a in the beam detection slit plate 19, passes through the condenser lens 21, and falls incident on the synchronization detection element 48. Upon receiving the light, the synchronization detection element 48 outputs a sensing signal to the control portion (not shown in the figures) in the laser printer 101.

Figure 10:
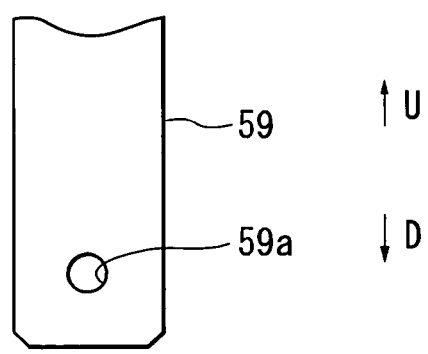
FIG. 10 illustrates a detection plate used for alignment detection.

When manufacturing the printer 101, after mounting the laser-control circuit board 4 on the synchronization detection room 22c of the scanner frame 22, the manufacturer uses a detection plate 59, shown in FIG. 10, to check whether or not the synchronization detection element 48, which is mounted on the under surface 4s2 of the laser-control circuit board 4, is aligned properly relative to the optical elements, such as the condenser lens 21, the slit 19a, and the mirror 20, which are mounted on the scanner frame 22 side.

The detection plate 59 is a flat plate. A detection through-hole 59a of a circular shape is formed through the detection plate 59 at a lower end of the detection plate 59. The area of the detection through-hole 59a is smaller than the effective aperture of the condenser lens 21. The manufacturer inserts the detection plate 59 through the through-hole 4a of the laser-control circuit board 4 from above into the synchronization detection room 22c. The light that has emitted from the light source 3 and that has passed through the opening 24 travels in the synchronization detection room 22c, passes through the through-hole 59a, and is gathered by the condenser lens 21.

If the synchronization detection element 48 is properly aligned relative to the condenser lens 21 and other optical elements 19a, 20, the synchronization detection element 48 receives an almost entire part of the light that is gathered by the condenser lens 21. The synchronization detection element 48 issues a sensing signal because the intensity of the received light is greater than the threshold. On the other hand, if the synchronization detection element 48 is out of alignment with the condenser lens 21 or other optical elements 19a, 20, the synchronization detection element 48 fails to receive a large part of the light that is gathered by the condenser lens 21. The synchronization detection element 48 issues no sensing signal because the intensity of the received light is smaller than the threshold.

Accordingly, after inserting the detection plate 59 through the through-hole 4a into the synchronization detection room 22c and driving the polygon mirror 12a to scan the light beam, the manufacturer checks whether or not the synchronization detection element 48 can properly issue a sensing signal. In this way, the manufacturer examines whether the synchronization detection element 48 is properly aligned relative to the condenser lens 21 and other optical components 20 and 19a. The manufacturer mounts, in the laser printer 101, only a scanner 60 whose synchronization detection element 48 is properly aligned relative to the condenser lens 21 and other optical components 20 and 19a, before shipping the laser printer 101 to a user. Accordingly, it is ensured that when the user purchases and uses the printer 101, the synchronization detection element 48 receives almost the entire part of light that has been gathered by the condenser lens 21 and therefore detects light with high sensitivity. The synchronization detection element 48 can detect light with high light-reception sensitivity, thereby executing an accurate synchronization detection in the optical path from the light source 3.

It is noted that the area of the through-hole 59a is smaller than the effective aperture of the condenser lens 21. The difference between the area of the through-hole 59a and the effective aperture of the condenser lens 21 serves as a margin. In other words, even if some light travels along an optical path that is outside the detection through-hole 59a, the light can still properly passes through the effective aperture of the condenser lens 21 and can be properly gathered by the condenser lens 21 before falling incident on the synchronization detection element 48. Accordingly, the optical paths that are outside of the detection through-hole 59a but that are inside the effective aperture of the condenser lens 21 serve as a margin. It is ensured that the light will be properly detected by the synchronization detection element 48 even if the alignment between the synchronization detection element 48 and the condenser lens 21 and other components 20 and 19a varies within this margin. It is ensured that the synchronization detection element 48 will continue to receive almost the entire part of light that is gathered by the condenser lens 21 even when the position of the synchronization detection element 48 relative to the condenser lens 21 and other components 20 and 19a varies within the margin.

As described above, according to the scanner 60, the laser-control circuit board 4 is mounted in an orientation to extend substantially parallel to the base plate 22a, the bottom cover 27, the top cover 25, and the tray 51. The synchronization detection element 48 is attached to the under surface 4s2 of the laser-control circuit board 4. On the upper side of the base plate 22a, a light beam is emitted from the light source 3, deflected by the polygon mirror 12a, and is guided by the fθ lens 14 and the mirror 16. Next, on the underside of the base plate 22a, the light is further guided by the mirror 17 and the cylindrical lens 15. The light then enters the synchronization detection room 22c, which is located on the upper surface 22as1 of the base plate 22a but below the laser-control circuit board 4. Accordingly, the light is guided below the laser-control circuit board 4 by the mirror 20, the slit 19a, and the condenser lens 21, before being finally detected by the synchronization detection element 48. The through-hole 4a is formed through the laser-control circuit board 4 to allow the manufacturer to check whether the synchronization detection element 48 is in alignment with the condenser lens 21 and other optical elements 20 and 19a below the laser-control circuit board 4.

The laser-control circuit board 4 is mounted in the scanner frame 22 in an orientation to extend substantially parallel to the base plate 22a, the bottom cover 27, and the top cover 25. Accordingly, the scanner frame 22 has a sufficiently large area for accommodating the laser-control circuit board 4 while making the size of the scanner 60 compact in the direction perpendicular to the bottom cover 27 and the top cover 25.

The synchronization detection element 48 is attached to the under surface 4s2 of the laser-control circuit board 4. The optical path of the light extends along the upper side of the base plate 22a from the deflection point on the polygon mirror 12a, then further extends along the underside of the base plate 22a to the opening 24, and then further extends along the upper side of the base plate 22a and below the laser-control circuit board 4 to the synchronization detection element 48. Accordingly, the length of the optical path from the deflection point on the polygon mirror 12a to the synchronization detection element 48 can be set sufficiently long and therefore can be set equal to the length of the optical path from the deflection point on the polygon mirror 12a to the photosensitive drum 66. Thus, the optical path between the polygon mirror 12a and the synchronization detection element 48 can be ensured within the scanner frame 22. The size of the scanner frame 22 can be made compact also in the direction parallel to the bottom cover 27 and the top cover 25.

The synchronization detection element 48 is attached to the underside of the laser-control circuit board 4. Accordingly, the various components 31, 32a-32e, and 33a can be arranged on the upper surface 4s1 of the laser-control circuit board 4 with high freedom.

When manufacturing the scanner 60, after mounting the laser-control circuit board 4 over the synchronization detection room 22c in the scanner frame 22, the detection plate 59 is inserted through the through-hole 4a of the laser-control circuit board 4 into the synchronization detection room 22c, thereby checking alignment of the synchronization detection element 48 relative to the condenser lens 21 and other optical elements 20 and 19a. Only the scanner 60, in which the synchronization detection element 48 is properly located relative to the condenser lens 21 and other optical elements 20 and 19a, is mounted in the laser printer 101. Accordingly, it is ensured that when the user purchases the laser printer 101 and uses the laser printer 101, the synchronization detection element 48 in the scanner 60 can detect light with high light-reception sensitivity and execute an accurate synchronization detection in the optical path from the light source 3.

The scanner 60 includes: the scanner frame 22, the upper cover 25, and the lower cover 27. The scanner frame 22 has the base plate 22a, and the laser control circuit board 4 is mounted on the base plate 22a to extend parallel with the base plate 22a. The light source 3, whose output is controlled by the circuit elements 32a-32e on the laser control circuit board 4, is mounted on the base plate 22a. The polygon mirror 12a is mounted on the base plate 22a to deflect and scan the light beam emitted from the light source 3. The synchronization detection element 48 is attached to the under surface 4s2 of the laser control circuit board 4 to detect the light scanned by the polygon mirror 12a to perform synchronization detection for image formation. The condenser lens 21 is mounted on the base plate 22a at a position below the laser control circuit board 4 to guide the light scanned by the polygon mirror 12a to the synchronization detection element 48. The through-hole 4a is formed through the laser control circuit board 4. By inserting the detection plate 59 through the through-hole 4a below the laser control circuit board 4, it is possible to detect the alignment between the synchronization detection element 48 and the condenser lens 21.

While the invention has been described in detail with reference to the specific embodiment thereof, it would be apparent to those skilled in the art that various changes and modifications may be made therein without departing from the spirit of the invention.

For example, in the above-described embodiment, the through-hole 4a is formed through the laser control circuit board 4. However, the through-hole 4a may not be formed through the laser control circuit board 4. Instead, a through-hole may be formed through the base plate 22a at a location between the slit plate 19 and the condenser lens 21. The detection plate 59 is inserted through the through-hole in the base plate 22a from the under surface 22as2 side to the upper surface 22as1 side, thereby checking alignment between the synchronization detection element 48 and the condenser lens 21, the slit 19a, and the mirror 20.

What is claimed is:

1. An optical scanning device, comprising:
  a base plate having a first surface and a second surface opposite to the first surface;
  a light source mounted on the first surface of the base plate, the light source emitting a light beam;
  a reflecting body mounted on the first surface of the base plate, the reflecting body deflecting and scanning the light beam emitted from the light source;
  a condenser lens mounted on the first surface of the base plate;
  a substrate mounted on the base plate, the condenser lens being located between the base plate and the substrate, the substrate extending substantially parallel with the base plate, the substrate having a first substrate surface and a second substrate surface opposite to the first substrate surface, the second substrate surface of the substrate confronting the first surface of the base plate;
  a synchronization detection element mounted on the second substrate surface of the substrate, the synchronization detection element receiving the light that has been deflected by the reflecting body and that has passed through the condenser lens to perform synchronization detection for image formation; and
  a circuit element mounted on the first substrate surface of the substrate, the circuit element controlling the light source.

2. The optical scanning device as claimed in claim 1, further comprising a detection portion that enables detection of alignment between the condenser lens and the synchronization detection element.

3. The optical scanning device as claimed in claim 1, further comprising an optical device that guides the light beam from the reflecting body to travel along the first surface and then along the second surface before reaching the synchronization detection element.

4. The optical scanning device as claimed in claim 1, wherein the light source includes a semiconductor laser device having at least one light-emitting element, the circuit element controlling output of the at least one light-emitting element.

5. The optical scanning device as claimed in claim 2, wherein the substrate is formed with a through-hole that enables insertion of a detection plate from the first substrate surface of the substrate toward the second substrate surface of the substrate at a location that allows the condenser lens to be located between the detection plate and the synchronization detection element, a detection through-hole being formed through the detection plate, the detection through-hole allowing the light deflected by the reflecting body to pass therethrough.

6. The optical scanning device as claimed in claim 5, wherein the area of the detection through-hole formed through the detection plate is smaller than an effective aperture of the condenser lens.

7. The optical scanning device as claimed in claim 1, further comprising a rib that protrudes from the first surface of the base plate in a direction intersecting the base plate and that supports the substrate thereon.

8. The optical scanning device as claimed in claim 1, further comprising:
  a drive motor that is mounted on the base plate and that drives the reflecting body to rotate; and
  a cooling portion that is provided to the base plate and that cools the drive motor.

9. The optical scanning device as claimed in claim 8, wherein the cooling portion includes:
  a fan mounted on the base plate; and
  a duct that is formed on the base plate and that extends between a location on the base plate where the fan is mounted and another location on the base plate where the drive motor is mounted.

10. The optical scanning device as claimed in claim 9, wherein the drive motor is mounted on the first surface of the base plate, and the fan is mounted on the second surface of the base plate.

11. The optical scanning device as claimed in claim 10, wherein the base plate is mounted on a tray, the second surface of the base plate confronting the tray, the duct being formed between the second surface of the base plate and the tray.

12. The optical scanning device as claimed in claim 11, wherein the fan is held between the second surface of the base plate and the tray, a shock-absorbing material being interposed between the fan and the second surface of the base plate, the shock-absorbing material being interposed also between the fan and the tray.

13. The optical scanning device as claimed in claim 11, wherein a cross-sectional area of the duct in the vicinity of the drive motor is smaller than a cross-sectional area of the duct in the vicinity of the fan.

14. The optical scanning device as claimed in claim 13, further comprising an attachment that is made of aluminum, the drive motor being attached to the base plate via the attachment, the attachment being exposed to the duct.

15. An image forming device, comprising:
  a photosensitive body; and
  an optical scanning device that scans a light beam on the photosensitive body to form an electrostatic latent image on the photosensitive body, the optical scanning device including:
- a base plate having a first surface and a second surface opposite to the first surface;
- a light source mounted on the first surface of the base plate, the light source emitting a light beam based on image data supplied from outside;
- a reflecting body mounted on the first surface of the base plate, the reflecting body deflecting and scanning the light beam emitted from the light source;
- a condenser lens mounted on the first surface of the base plate;
- a substrate mounted on the base plate, the condenser lens being located between the base plate and the substrate, the substrate extending substantially parallel with the base plate, the substrate having a first substrate surface and a second substrate surface opposite to the first substrate surface, the second substrate surface of the substrate confronting the first surface of the base plate;
- a synchronization detection element mounted on the second substrate surface of the substrate, the synchronization detection element receiving the light that has been deflected by the reflecting body and that has passed through the condenser lens to perform synchronization detection for image formation; and
- a circuit element mounted on the first substrate surface of the substrate, the circuit element controlling the light source.

* * * * *